United States Patent [19]

Knifton

[11] 4,048,093

[45] Sept. 13, 1977

[54] PROCESSES FOR REGENERATING DISPERSIONS OF LIGAND-STABILIZED, PALLADIUM(II) HALIDE COMPLEXES USED IN CARBONYLATION CATALYSTS

[75] Inventor: John F. Knifton, Poughquag, N.Y.

[73] Assignee: Texaco Inc., New York, N.Y.

[21] Appl. No.: 635,995

[22] Filed: Nov. 28, 1975

[51] Int. Cl.$^2$ .................. B01J 31/40; B01J 27/32; C07C 51/00; C11C 3/02
[52] U.S. Cl. .................................. 252/414; 252/412; 260/410.9 R; 260/429 R; 260/429.7; 260/514 M; 260/515 R; 260/533 A; 560/114; 560/232
[58] Field of Search .................. 252/412, 414, 429; 260/410.9 R, 413

[56] References Cited

U.S. PATENT DOCUMENTS

| | | | |
|---|---|---|---|
| 3,420,873 | 1/1969 | Olivier | 252/415 |
| 3,455,989 | 7/1969 | Kutepow et al. | 260/514 M |
| 3,641,076 | 2/1972 | Booth | 260/429 R |
| 3,700,706 | 10/1972 | Butter | 260/410.9 R |
| 3,832,391 | 8/1974 | Parshall | 260/413 |

*Primary Examiner*—Winston A. Douglas
*Assistant Examiner*—P. E. Konopka
*Attorney, Agent, or Firm*—Thomas H. Whaley; Carl G. Ries; Bernard Marlowe

[57] ABSTRACT

This invention concerns processes for the regeneration of carbonylation catalysts consisting of dispersions of ligand-stabilized palladium(II) halide complexes in quaternary ammonium, phosphonium and arsonium salts of trihalostannate(II) and trihalogermanate(II) using organic peroxides as the regenerating agent.

2 Claims, No Drawings

4,048,093

PROCESSES FOR REGENERATING DISPERSIONS OF LIGAND-STABILIZED, PALLADIUM(II) HALIDE COMPLEXES USED IN CARBONYLATION CATALYSTS

STATEMENT OF THE INVENTION

This invention pertains to the art of regenerating spent palladium carbonylation catalysts useful for the carbonylation of olefins.

More particularly, this invention concerns the regeneration of certain carbonylation catalysts consisting of dispersions of ligand-stabilized palladium(II) halide complexes in quaternary ammonium, phosphonium and arsonium salts of trihalostannate(II) and trihalogermanate(II) using substantially anhydrous organic peroxide reagents.

BACKGROUND OF THE INVENTION

This invention concerns a process for regenerating certain palladium catalysts used in the carbonylation of olefins. Carbonylation refers here to the reaction of α-olefins with carbon monoxide and active-hydrogen-containing compounds selected from the group consisting of alkanols or water. The major products of carbonylation are fatty(carboxylic) acids and their esters.

The preparation of the fatty acids or fatty acid esters using metal carbonyls or carbonyl precursors to catalyze the carbonylation of olefins is old in the literature, originally involving Reppe and his coworkers and contemporaries. Reviews by C.W. Bird [Chem. Rev.62, 283 (1962)] document this work. Unfortunately, many of these carbonyl or carbonyl-type catalysts have the disadvantages of inherent toxicity, they require stringent reaction conditions which in turn lead to competing side reactions such as olefin isomerization, polymerization and reduction, and they exhibit poor selectivity to the desired linear acid ester.

Recently, more acceptable homogeneous catalyst systems have been developed which offer substantially improved selectivity in converting olefins to primarily linear fatty acids or linear fatty esters, in good yield, under moderate reaction conditions of temperature and pressure.

As is usually the case, after much more extensive usage, certain drawbacks in the catalysts have become more evident. These include difficulty in maintaining high conversions, high selectivities and high yields after recycling the catalyst several times. These problems are due to catalyst degradation as well as catalyst decomposition, mechanical losses and further catalyst decomposition during the separation of the products from the homogeneous catalysts and the inert solvents of the reaction mixture. Thermal instability of the catalyst is particularly troublesome in the recovery and working-up of certain ligand-stabilized homogeous palladium catalyst reaction mixtures.

In order to avoid or minimize these problems, the use of molten quaternary ammonium, phosphonium and arsonium salts of trihalostannate(II) and trihalogermanate (II) as both solvent and part of the catalytic entity has been disclosed, particularly in the two U.S. patents of G.W. Parshall, U.S. Pat. Nos. 3,657,368 and 3,565,823, which are known in the art as well as in applicant's Ser. No. 526,867 filed 11/25/74 in the U.S. Patent Office. More recently, two procedures, involving distillation and solvent extraction, for isolating product fatty acids/esters from palladium carbonylation catalysts consisting of dispersions of ligand-stabilized palladium(II) halides in quaternary ammonium, phosphonium and arsonium salts of trihalostannate(II) and trihalogermante(II) have been set forth in Ser. No. 581,320 and Ser. No. 581,395 both filed May 27, 1975. Following the separation of the catalyst and fatty acid ester products by these methods the palladium catalyst is suitable for recycle with fresh olefin/alcohol feed. Claims to the regeneration of the same palladium catalysts after multiple cycling by chlorination or treatment with mineral acid are also set forth in the above two applications. Each of these applications also discloses that a useful carbonylation must have:

1. A simple and efficient means of separating catalysts from the products,
2. The ability to recycle the catalyst without its substantial deactivation. This is particularly important since the palladium catalysts are thermally sensitive, and
3. A capability of operating at high concentrations of catalyst in the feed stream, thereby minimizing capital costs.

DESCRIPTION OF THE INVENTION

The innovative and claimed aspect of this application is the discovery that the loss of catalytic activity of the above mentioned spent palladium carbonylation dispersion catalysts, can be restored by treatment of the catalysts with substantially anhydrous organic peroxides. The use of the latter (alternatively referred to as hydroperoxides) reagents is exemplified in Example 1, described infra. Here the octene, ethanol mixture is carbonylated by the procedure described, the ethyl nonanoate ester recovered by distillation, and after five cycles, the solid catalyst regenerated as follows:

1. The recovered catalyst is treated with organic peroxide reagent, preferably in the presence of an inert solvent, and the mixture heated under an inert atmosphere.
2. Excess liquid is removed by distillation under reduced pressure.
3. Additional stabilizing ligand, such as triphenylphosphine, is added to the cooled melt catalyst after peroxide treatment in the mole ratio of 1-10 mole ligand per mole Pd. The regenerated catalyst is then ready for recycle to the carbonylation reactor with fresh olefin/alcohol feed.

Generally speaking, a wide range of peroxide and hydroperoxide reagents may be employed to regenerate said palladium carbonylation catalysts, Suitable hydroperoxide reagents include tert-butylhydroperoxide, cumene hydroperoxide, p-menthane hydroperoxide and 2,5-dimethylhexyl-2,5-dihydroperoxide. Suitable peroxide reagents include carprylyl peroxide, lauroyl peroxide, acetyl peroxide, benzoyl peroxide, p-chlorobenzoyl peroxide, dicumyl peroxide, di-t-butyl peroxide, t-butyl peracetate, t-butyl perbenzoate, and methyl ethyl ketone peroxide.

At least a stoichiometric amount of peroxide reagent should be added to the spent palladium catalyst in order to achieve satisfactory regeneration, that is at least one mole of peroxide regent per gram atom of palladium present in the catalyst. Preferably, an excess of peroxide reagent should be employed, from 1 to $10^4$ moles of peroxide reagent per gram atom of palladium. Regeneration is judged to have occurred when a sample of treated catalyst delivers a selectivity to the desired linear fatty (carboxylic) acid or ester of between 70 and 95%, and a yield of total ester of from 20 to 95%.

The peroxide or hydroperoxide regenerating reagents may be added to the spent catalyst neat, but preferably they are added in dilute form in the presence of a dried, inert solvent. Suitable inert solvents include among others, paraffinic solvents such as petroleum ethers, heptane, hexane and n-octane etc., ketones such as methyl isobutyl ketone, acetone and methyl ethyl ketone, chlorinated solvents such as o-dichlorobenzene, methylene chloride, and chloronaphthalenes, sulphones such as dimethylsulphone, aromatics such as benzene, toluene and xylenes, and mixtures thereof.

The quatity of solvent used to dilute the organic peroxide or hydroperoxide reagent is not critical as to volume, for convenience sake about 0.1 parts by volume to $10^4$ parts by volume of inert solvent may be employed for each volume part of peroxide reagent. Likewise the time and temperature of regeneration are not initial, and temperatures of 20° to 150° C may be employed for 0.01 to 48 hours, according to the choice of palladium catalyst to be regenerated, and the choice of peroxide reagent.

Catalyst regeneration is normally carried out in the presence of an inert atmosphere. This may be nitrogen, helium, argon, neon, carbon dioxide, or mixtures thereof, or the regeneration may be carried out in vacuo.

Regeneration of palladium carbonylation catalysts with peroxide reagents is exemplified infra in Example 1 for the melt complex $[(C_2H_5)_4N][SnCl_3]\text{-}PdCl_2[P(C_6H_5)_3]_2$. Other palladium carbonylation catalysts beyond $[(C_2H_5)_4N][SnCl_3]\text{-}PdCl_2[P(C_6H_5)_3]_2$ may also be generated by this technique. These catalysts generally consist of ligand-stabilized palladium(II) halide complexes dispersed in quaternary ammonium, phosphonium and arsonium salts of trihalostannate(II) and trihalogermanate(II). They are illustrated, but not limited by, the carbonylation catalysts described in Examples 8 to 14.

Other substrate mixtures beyond the 1-octene, ethanol used in Example 1 may also be carbonylated by the regenerated palladium carbonylation catalysts. Some typical examples are given in Examples 15 to 20, described infra. Generally, for the carbonylation of α-olefins, as exemplified in equation 1, $R_1$ and $R_2$, individually, may by hydrogen, alkyl up to 12 carbon atoms, alkenyl up to 12 carbon atoms, or aryl up to 12 carbon atoms, or mixed alklaryl or arylalkyl groups. Suitable alkanols (ROH) include primary and secondary alcohols of 1 to 12 carbon atoms, phenols, substituted alcohols and polyols. The major products of the carbonylation reaction are fatty (carboxylic) acids and their esters.

EXAMPLE 1

PREPARATION OF ETHYL NONANOATE WITH RECOVERY OF ESTER BY DISTILLATION AND REGENERATION OF PALLADIUM CATALYST VIA TREATMENT WITH TERT-BUTYL HYDROPEROXIDE

To a degassed sample of 1-octene (0.5 mole) and ethanol (0.5 mole) contained in a glass lined reactor equipped for pressurizing, heating, cooling and means of agitation, is added the following reactants under a nitrogen purge, tetraerhylammonium trichlorostannate(II) (8.0 mmole) and bis(triphenylphosphine) palladium(II) chloride (8.0 mmole). The mixture is purged with carbon monoxide and heated to 80° C under 1500 psig of carbon monoxide. The carbonylation reaction is terminated after 6-8 hours by cooling and venting and the liquid product (108 ml) recovered from the solid catalyst by filtration. Unreacted octenes and ethanol are removed from the liquid product by distillation under reduced pressure (5-cm Hg) and the residual liquid subjected to further distillation. Ethyl nononate products are recovered in up to 71 mole % yield (>99% purity) as distillate fraction having a boiling point of 58°-62° C at 2 mm Hg pressure. The residual palladium chloride catalyst $[(C_2H_5)_4N][SnCl_3]\text{-}PdCl_2[P(C_6H_5)_3]_2$ melt catalyst is recharged to the reactor with additional fresh 1-octene (0.5 mole) and ethanol (0.5 mole) and the carbonylation reaction is repeated as described above. Ethyl nononates are recovered by in vacuo distillation.

After the fifth cycle the spent catalyst is regenerated by treatment with a solution of tert-butylhydroperoxide (10 gm) in toluene (100 ml), the mixture refluxed under nitrogen for 3 hours, and excess liquid removed by distillation under reduced pressure (5 cm Hg). The regenerated catalyst is then returned to the reactor with additional triphenylphosphine (4.19 gm, 16 mmole) and 1-octene, ethanol (0.5 mole each), carbonylation and ethyl nononoate isolation and recovery are as described above.

The performance of the palladium catalyst after tert-butylhydroperoxide treatment (See Table L) appears comparable with fresh material. The total yield of ethyl nononoates over Cycles VI → [X is 136 mole per g. atom Pd charged, versus 133 mole per fresh material (Cycles I-IV)]. Also, the purity of the isolated ester remains at 98% or better.

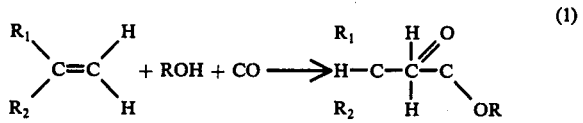

(1)

TABLE I

| | PREPARATION OF ETHYL NONANOATE WITH RECOVERY OF ESTER BY DISTILLATION AND REGENERATION OF PALLADIUM CATALYST BY TREATMENT WITH TERT-BUTYLHYDROPEROXIDE | | | | |
|---|---|---|---|---|---|
| | | ETHYL C<sub>9</sub> ESTER | | LIQUID | ISOLATED ESTER |
| CYCLE | PROCEDURE | LINEARITY(%) | YIELD(MOLE %)[b] | YIELD(%) | PURITY(%) |
| I | FRESH CATALYST | 63.6 | 97 | 94 | 99 |
| II | RECYCLE | 88.3 | 69 | 100 | " |
| III | " | 90.5 | 33 | " | " |
| IV | " | 91.4 | 13 | " | 99 |
| V | " | 91.8 | 9/5 | " | 98 |
| VI | REFLUX WITH T-B<sub>u</sub>OOH' +PPh<sub>3</sub> | 86.5 | 95 | 87 | 99 |
| VII | RECYCLE | 77.1 | 90 | 99 | " |
| VIII | " | 79.8 | 31 | 93 | " |
| IX | " | N.D. | 1 | 97 | " |

[b]Type of ethyl C<sub>9</sub> ester based upon 1-octene charged, calculated by G.L.P.C.

EXAMPLES 2-7

PALLADIUM CATALYST REGENERATION - EFFECT OF CHANGES IN PEROXIDE REAGENT COMPOSITION

In these examples the carbonylation of equimolar 1-octene, ethanol mixtures is carried out in accordance with the procedure outlined in Example 1, but after 4 cycles the palladium catalyst, viz.

$$10[(C_2H_5)_4N][SnCl_3]\text{-}PdCl_2[P(C_6H_5)_3]_2$$

is regenerated by treatment with peroxide reagents other than t-butyl hydroperoxide. Employing the regeneration technique described in Example 1, the following peroxide reagents restored the palladium catalyst to a satisfactory level of performance:
  cumene hydroperoxide
  benzoyl peroxide
  acetyl peroxide
  di-t-butyl peroxide
  methyl ethyl ketone peroxides
  dicumyl peroxide

EXAMPLES 8-14

PALLADIUM CATALYST REGENERATION EFFECT OF CATALYST COMPOSITION

In these examples the carbonylation of 1-octene, ethanol samples and regeneration of palladium catalyst are carried out in accordance with the procedure outlined in Example 1, but in the presence of various other ligand-stabilized palladium(II) halide complexes dispersed in quaternary ammonium, phosphonium and arsonium salts of trihalostannate(II) and trihalogermanate(II). The following catalyst compositions showed satisfactory performance for ethyl nonanoate synthesis over 8 cycles:

$10[(C_2H_5)_4N][SnCl_3]\text{-}PdCl_2[P(p\text{-}CH_3.C_6H_4)_3]_2$
$5[ClCH_2(C_6H_5)_3P][SnCl_3]\text{-}PdCl_2[P(C_6H_5)_3]_2$
$10[(n\text{-}C_4H_9)_4N][SnCl_3]\text{-}PdCl_2[P(C_6H_5)_3]_2$
$10[(C_6H_5)_4As][SnCl_3]\text{-}PdCl_2[P(C_6H_5)_3]_2$
$5[(C_2H_5)_4N][GeCl_3]\text{-}PdCl_2[P(C_6H_5)_3]_2$
$10[(C_2H_5)_4N][SnCl_3]\text{-}PdCl_2[P(p\text{-}CH_3O.C_6H_4)_3]_2$
$5[(C_7H_{15})_4N][GeCl_3]\text{-}PdCl_2[As(C_6H_5)_3]_2$

EXAMPLES 15-20

PALLADIUM CATALYST REGENERATION —EFFECT OF CHANGES IN REACTIONS

In these examples the carbonylation of samples of equimolar α-olefin-alkanol mixtures are carried out in accordance with the procedures outlined in Example 1, using the same dispersion of palladium complex in quaternary salts, viz.

$$10[(C_2H_5)_4N][SnCl_3]\text{-}PdCl_2[P(C_6H_5)_3]_2$$

The following olefin-alkanol mixtures gave good yields of the corresponding esters over 8 catalyst cycles experiments:
  Propylene — 1-decanol
  1-Hexane — iso-propanol
  1-Decene — 2-chloroethanol
  1-Tetradecene — methanol
  1-Octene — 2-ethylhexanol
  1-Octene — phenol As the previous data and comments have indicated, the procedures for catalyst regeneration of this invention are both novel and useful. They may be applied to catalysts consisting of dispersons of ligand-stabilized palladium(II) halide salts in quaternary ammonium, phosphonium and arsonium salts of trihalostannate(II) and trihalogermanate(II) useful in the catalytic carbonylation of olefins.

Further, the invention processes are flexible in permitting changes and modifications to be made without departing from the inventive process.

However, the metes and bounds of this invention can best be gleaned by reading the claims that follow in conjunction with the rest of the specification.

What is claimed is:

1. A process for regenerating spent palladium catalysts utilized in olefin carbonylation reactions consisting of dispersions of ligand-stabilized palladium(II) halide complexes in quaternary ammonium, phosphonium and arsonium salts of trihalostannate(II) and trihalogermanate(II) by the steps of:
   a. Forming a reaction mixture consisting essentially of spent palladium catalyst selected from the group consisting of:
   $[(C_2H_5)_4N][SnCl_3]\text{-}PdCl_2[P(C_6H_5)_3]_2$,
   $[(C_2H_5)_4N][SnCl_3]\text{-}PdCl_2[P(p\text{-}Ch_3.C_6H_4)_3]_2$,
   $[ClCH_2(C_2H_5)_3P][SnCl_3]\text{-}PdCl_2[P(C_6H_5)_3]_2$,
   $[(n\text{-}C_4H_9)_4N][SnCl_3]\text{-}PdCl_2[P(C_6H_5)_3])_2$,
   $[(C_6H_5)_4As][SnCl_3]\text{-}PdCl_2[P(C_6H_5)_3]_2$,
   $[(C_2H_5)_4N][GeCl_3]\text{-}PdCl_2[P(C_6H_5)_3]_2$,
   $[(C_2H_5)_4N][SnCl_3]\text{-}PdCl_2[P(p\text{-}CH_3O.C_6H_4)_3]_2$, and
   $[(C_7H_{15})_4N][GeCl_3]\text{-}PdCl_2[As(C_6H_5)_3]_2$,
   with organic peroxide in the mole ratio of 1 to $10^4$ mole of organic peroxide per gram atom of palladium present in the spent catalyst, and in the presence of dry inert solvent selected from the group consisting of unsubstituted aromatic hydrocarbons, unsubstituted paraffins, chlorinated paraffins, chlorinated aromatic hydrocarbons, ketones and sulfones and inert gaseous environment, until a reaction mixture is formed, said organic peroxide in the reaction mixture being selected from the group consisting of:
   t-butyl hydroperoxide,
   dumene hydroperoxide,
   benzoyl peroxide,
   acetyl peroxide,
   di-t-butyl peroxide,
   methyl ethyl ketone peroxide, and
   dicumyl peroxide;
   b. Heating said regeneration reaction mixture between 20° to 150° C until the spent catalyst is regenerated in said reaction mixture,
   c. Removing the excess solvent under reduced pressure,
   d. Adding additional stabilizing ligand selected from the group consisting of triphenylphosphine, triphenylarsine, and tri-p-methoxyphenylphosphine to the solid catalyst in the mole ratio of 1-10 mole of ligand per gram atom of palladium present, and
   e. Recycling the regenerated catalyst with fresh olefin feed back to the carbonylation reaction.

2. A process for regenerating spent olefin carbonylation catalysts of ligand-stabilized palladium(II) halide complexes in quaternary ammonium, phosphonium and arsonium salts of trihalostannate(II) or trihalogermanate(II) wherein said ligand stabilized catalysts are selected from the group consisting of:
$[(C_2H_5)_4N][SnCl_3]\text{-}PdCl_2[P(C_6H_5)_3]_2$,
$[(C_2H_5)_4N][SnCl_3]\text{-}PdCl_2[P(p\text{-}CH_3.C_6H_4)_3]_2$,

[ClCH$_2$(C$_6$H$_5$)$_3$P][SnCl$_3$]-PdCl$_2$[P(C$_6$H$_5$)$_3$]$_2$,
[(n.C$_4$H$_9$)$_4$N][SnCl$_3$]-PdCl$_2$[P(C$_6$H$_5$)$_3$]$_2$,
[(C$_6$H$_5$)$_4$As][SnCl$_3$]-PdCl$_2$[P(C$_6$H$_5$)$_3$]$_2$,
[(C$_2$H$_5$)$_4$N][GeCl$_3$]-PdCl$_2$P(C$_6$H$_5$)$_3$]$_2$,
[(C$_2$H$_5$)$_4$][SnCl$_3$]-PdCl$_2$[P(p-CH$_3$O.C$_6$H$_4$)$_3$]$_2$, and
[(C$_7$H$_{15}$)$_4$N][GeCl$_3$]-PdCl$_2$8 As(C$_6$H$_5$)$_3$]$_2$, by the steps of:

a. Mixing said spent carbonylation catalyst with at least one mole of organic peroxide per gram of palladium in the spent catalyst, said organic peroxide being selected from the group consisting of:
t-butyl hydroperoxide,
dumene hydroperoxide,
benzoyl peroxide,
acetyl peroxide,
di-t-butyl peroxide,
methyl ethyl ketone peroxide, and
dicumyl peroxide, in the presence of dry inert organic solvent selected from the group consisting of unsubstituted aromatic hydrocarbons, unsubstituted paraffins, chlorinated paraffins, chlorinated aromatic hydrocarbons, ketones and sulfones to form a reaction mixture, b. Heating said reaction mixture at temperatures ranging from 20° to 150° for a time ranging from 0.01 to 48 hours, c. Removing excess solvent under reduced pressure until a dried paladium catalyst is obtained, and d. Adding additional stabilizing ligand to the dried palladium catalyst wherein the stabilizing ligand is selected from the group consisting of triphenylphosphine, triphenylarsine and tri-p-methoxyphenylphosphine, said mole ratio of ligand added per gram atom of palladium varies from 1 to 10 moles of ligand per gram atom of palladium, until said spent catalyst is regenerated.

* * * * *